3,554,944
UNSATURATED POLYAMIDE RESINS
Dietrich Helm, Unna, and Rainer Janssen, Altlunen, Germany, assignors to Schering AG, Bergkamen, Germany
No Drawing. Filed July 30, 1968, Ser. No. 748,629
Claims priority, application Germany, Aug. 5, 1967, Sch 41,100
Int. Cl. C08g 20/20, 51/70, 20/38
U.S. Cl. 260—18    9 Claims

ABSTRACT OF THE DISCLOSURE

A reactive unsaturated polyamide resin prepared by condensing a high molecular weight polycarboxylic acid ($C_{12}$ or greater) and an aliphatic primary or secondary diamine ($C_3$ or greater) to form a product with free amino groups which are then reacted with maleic acid anhydride. The unsaturated polyamide resin can also be further modified by reaction of the carboxyl groups with mono- or di-epoxide compounds. Hardenable mixtures of such a resin with a copolymerizable monomer such as styrene. Resin bodies prepared by hardening such mixtures by free-radical polymerization.

---

The present invention relates to reactive unsaturated polyamide resins, to hardenable resin mixtures and hardened resin bodies containing said resins, and to methods of making said resins, hardenable resin mixtures, and hardened resin bodies.

The novel reactive unsaturated polyamide resins of the present invention are prepared by the reaction of maleic acid anhydride with condensation products containing free amino groups, with the formation of imides or amides. The condensation products in turn are prepared from an acid component (a) comprising a high molecular weight branched polycarboxylic acid having at least twelve carbon atoms, or a lower alkyl ester thereof, preferably (1) a polymeric fatty acid, (2) an adduct or copolymer of an unsaturated fatty acid with an $\alpha,\beta$-unsaturated mono- or di-carboxylic acid, (3) a carboxystearic acid, carboxymethyl stearic acid, and/or carboxyethyl stearic acid, or (4) a lower alkyl ester of the aforementioned polycarboxylic acids. An optional acid component (b) comprising an aliphatic or aromatic dicarboxylic acid having 6 to 12 carbon atoms, or a lower alkyl ester thereof, may be present in an amount up to 40 equivalent percent calculated on the total amount of polycarboxylic acid. The condensation product also comprises an amine component (c) of an aliphatic diamine, preferably a branched chain material, having at least 3 carbon atoms and having primary or secondary amino groups. The condenastion products comprise from 0.35 to 3.5 milliequivalents of free amino end groups per gram, preferably 0.5 to 2.5 meq./gm.

The hardenable resin mixtures of the present invention comprise the aforementioned reactive polyamide resins and vinyl aromatic compounds, particularly styrene, and/or other copolymerizable monomers, particularly acryl and allyl compounds, optionally together with fillers and/or other conventional additives, and are hardened by free radical forming catalysts, particularly organic peroxides, to form the hardened resin bodies of the present invention.

The preparation of the reactive unsaturated resins of the present invention has several surprising aspects. First, it is known in the art that polycondensation products containing amide groups and comprising short chain dicarboxylic acids such as maleic acid and its derivatives have the disadvantage that they are insoluble, or only slightly soluble, in numerous conventional solvents. Therefore, it could not have been predicted that the unsaturated polyamide resins of the present invention would have the good solubility properties which they possess.

Further, it is generally known that aliphatic amino groups are very easily added to the double bond of $\alpha,\beta$-unsaturated carboxylic acids. Because of this interfering side reaction, the polycondensation of compounds containing aliphatic amino groups with maleic acid or its derivatives, with retention of the double bonds of the maleic acid as in the present invention, would not appear possible to one skilled in the art.

It is further known that the formation of imides can interfere with the polycondensation of maleic acid or its derivatives with compounds containing amino groups, but such interference is not significant in the present process.

Independent of any specific structure, the unsaturated polyamide resins according to the present invention show good solubility in diverse solvents, and particularly in pure aromatic solvents, at the high concentrations which are of practical interest. The term "soluble" as employed herein includes those solutions forming reversible gels, as well as those which are fluid, at room temperature. Even for those resins of the invention which contain high concentrations of maleic acid, for example 10 percent by weight, it is possible to prepare fluid solutions having a concentration of as high as 70 percent in aromatic solvents, and particularly in styrene. To reach solubilities as high as this, certain measures described further below should be observed. On the other hand, for many fields of use, particularly for impregnation and the formation of layers, the preparation of solutions containing 50 percent or less of polyamide is sufficient.

According to the present invention, polymeric fatty acids, adducts or copolymers of unsaturated fatty acids with $\alpha,\beta$-unsaturated mono- or di-carboxylic acids, carboxystearic acids, carboxymethyl- or carboxyethyl-stearic acids, or their esters, or mixtures thereof can be employed as the polycarboxylic acid component of the resins of the invention. If the esters are reacted, esters of monovalent alcohols having from 1 to 4 carbon atoms are preferred. In general, the polycarboxylic acids used in the invention are long-chain, branched, di- or poly-carboxylic acids. Polymeric fatty acids are the polymerization products of mono- or poly-unsaturated fatty acids. The polymerization can be carried out by different methods, for example thermally in the presence of catalysts such as catalytically active clays, or with free radical forming compounds, for example according to U.S. Pats. 2,482,-761; 2,731,481; 2,347,562; 2,793,219; 2,793,220; 2,955,-121; 3,059,003; 3,100,784; and 3,157,681. The term "polymeric fatty acid" as employed herein encompasses not only homopolymeric fatty acids, but also copolymeric fatty acids, that is polycarboxylic acids in which two or more fatty acid molecules are directly linked or are bonded by means of co-components. As co-components for the copolymerization of fatty acids, the usual polymerizable comonomers, such as vinyl aromatic compounds like styrene, come into consideration. Suitable copolymerization techniques are described, for example, in U.S. Pat. 3,271,432 and Belgian Pat. 627,128.

Polymeric fatty acids which contain higher-functional as well as mono-functional carboxylic acids in addition to the dicarboxylic acids predominantly formed during polymerization can be used in the reactive unsaturated polyamide resins of the invention. Optionally, the mono-functional carboxylic acids can be entirely or partially removed from polymeric fatty acid products by distillation, or the pure dicarboxylic acids can be obtained by distillation. It is also possible to saturate the polymeric fatty acids to a greater or lesser extent by hydrogenation.

A further group of known polycarboxylic acids which can be employed in the present invention comprises adducts or copolymers of unsaturated fatty acids with $\alpha,\beta$-unsaturated mono- or di-carboxylic acids. These materials can be obtained inter alia from simple unsaturated fatty acids, for example oleic acid, and from $\alpha,\beta$-unsaturated acids, for example maleic acid or maleic acid anhydride, by heating with or without catalysts in the manner of a substituting addition, for example according to U.S. Pats. 2,188,882; 2,560,595; and 2,598,634. If polyunsaturated fatty acids and, particularly, trans-trans-conjugated fatty acids are employed, the reaction generally takes place according to a Diels-Alder addition. The preferred $\alpha,\beta$-unsaturated carboxylic acids for adducts of this kind are maleic acid or maleic acid anhydride, or acrylic acid or acrylic acid esters. All the adducts can be reacted according to the process of the present invention as free acids or as their lower alkyl esters. Further, they can be hydrogenated to improve their color and/or their stability to light, oxidation, and heat. In this case also, unreacted mono-functional fatty acids can be more or less completely separated.

Carboxystearic acids and their lower alkyl esters can be obtained in various ways. The most common are the synthesis according to Koch using oleic acid, carbon monoxide and water in the presence of Lewis acids at catalysts, and the synthesis of Reppe in which nickel carbonyl is employed as a carrier. The Koch synthesis is described inter alia in Brennstoff-Chemie 36, 321 (1955). The Reppe synthesis is described in German Pats. 861,243; 868,149; 1,006,849, for example. Carboxymethyl stearic acid and its esters can be obtained from oleic acid or oleic acid esters by the addition of acetic acid or acetic acid anhydride.

Small amounts of short-chain, saturated, linear or branched dicarboxylic acids such as adipic, azelaic, sebacic, dimethyl adipic, trimethyl adipic, orthophthalic, isophthalic, and terephthalic acids can be condensed into the polyamide resins together with the aforementioned polycarboxylic acids. However, in many cases the solubility of the resins is impaired with increasing amounts of these acids.

The amount of such short chain dicarboxylic acids can vary up to 40 equivalent percent, calculated on the total polycarboxylic acid with the exception of the terminal maleic acid, depending on the other starting materials employed, particularly on the diamine, and on the solubility required in the final product.

Suitable aliphatic, preferably branched, diamines having at least three carbon atoms and primary or secondary amino groups are, for example, diprimary aliphatic amino groups, as is the case in aminoethyl piperazine, for ous isomers of diamino-butane, -pentane, -hexane, -heptane, -octane, and -nonane, particularly isomeric mixtures of 2,4,4- and 2,2,4-trimethyl-hexamethylene diamine; 9- or 10-amino stearyl amine; diamines derived from dimeric fatty acids and the like; aryl-substituted aliphatic diamines such as 2-phenyl-1,5-diamino pentane and the like; diamines which are alkyl-substituted on one or both nitrogen atoms, such as N-ethyl ethylene diamine, N-methyl propylene diamine, N-butyl propylene diamine, N,N'-dimethyl propylene diamine, and the like; or cyclic secondary diamines such as dipiperidylpropane; cycloaliphatic diamines such as 3-aminomethyl-3,5,5-trimethyl cyclohexylamine, 1,8-diamino-p-menthane, bis-(amino-methyl cyclohexyl)-methane; araliphatic diamines such as di-(aminomethyl)-benzene; or mixtures of these amines.

The diamines may also have one or more ether groups therein. Exemplary of such compounds are di-(aminopropyl) ether; diamino-4,7-dioxadecane; $a,\omega$-diamino-4,9-dioxadodecane; 1,4-di(amino-n-propoxymethyl) cyclohexane; the ether diamine obtained from fatty alcohols by cyanoethylation and hydrogenation; and the like. In addition to containing two prmary or secondary amino groups, the amines may also have additional tertiary amino groups, as is the case in aminoethyl piperazine, for example. The tertiary groups are not considered in the calculation of the amine equivalent ratio.

In the preparation of the reactive, unsaturated, soluble polyamide resins of the present invention, the polycarboxylic acids are condensed with the aliphatic diamines in a first reaction step, with separation of the water of reaction, to form polyamide resins containing amino groups.

In general, temperatures up to 250° C. can be employed. However, in order to avoid undesired side reactions, limitation of the polycondensation temperature to about 170°–180° C. is suitable. For acceleration and completion of the reaction, particularly toward the end of the condensation, it can be carried out under vacuum.

The ratio of amino groups to carboxyl groups in the starting materials used in this first step generally lies between about 0.8:1 and about 2:1. Within this general region, certain values are preferred for different combinations of polycarboxylic acids and diamines. Thus, an equivalence ratio between about 1.2:1 and about 2:1 is chosen for carboxylic acids which are not capable of forming imide structures. When polycarboxylic acids adaptable to the formation of cyclic imides are used, for example adducts or copolymers of maleic acid and unsaturated fatty acids, the equivalence ratio is chosen between about 0.8:1 and about 1:1. For mixtures of acids capable of forming imides with acids incapable of imide formation, corresponding intermediate values are selected.

The equivalence ratio should be such that the condensation product comprises from 0.35 to 3.5, particularly from 0.5 to 2.5, milliequivalents of free amino groups per gram. This implies that the condensation products have amine numbers between 20 and 200, particularly between 30 and 140.

In a second reaction step maleic acid anhydride is added to this intermediate product containing reactive amino end groups. In this step, 0.5–1 mol of maleic acid anhydride, preferably 1 mol of maleic acid anhydride, is reacted per equivalent of reactive end groups. This second step of the process of the present invention can generally be carried out at a temperature between room temperature and about 150° C. The reaction proceeds with a definite heat effect.

Since products with relatively high viscosities are usually formed, working at higher temperatures or using inert solvents is appropriate. Significant decreases in viscosity are effected by alcohols in small amounts. In principle, the alcohol can also add to maleic anhydride. However, the addition of hydroxyl groups is considerably slower than that of amino groups, so that alcohols, particularly secondary and tertiary alcohols, can be considered to be inert, particularly when the amount of such alcohols is limited to a few percent.

In most cases, the addition is completed in less than one hour. If, as is generally the rule, one mol of anhydride per equivalent of amine groups is reacted, the amine number after the addition is 0. In this manner, the course of the reaction can be easily and quickly followed.

If temperatures over 100° C. are employed during or after the addition of the maleic acid anhydride, imide structures may occur providing that primary amino groups are present in the starting materials.

The reactive unsaturated polyamide resins of the invention can be modified by reaction of the free carboxy groups present in the resins with epoxy compounds. For this reaction, the known mono- and di-epoxides can be employed, for example aromatic glycidyl ethers such as phenyl- and cresyl-glycidyl ether and the diglycidyl ethers of 2,2-bis(4-hydroxy)phenyl-propane; aliphatic glycidyl ethers such as butyl glycidyl ether and 2- ethyl-hexyl glycidyl ether; butane diol diglycidyl ether; and cycloaliphatic glycidyl ethers such as cyclohexanol glycidyl ether. Glycidyl esters such as benzoic acid glycidyl ester and phthalic acid diglycidyl ester; aliphatic epoxides such as ethylene oxide and propylene oxide; cycloaliphatic epoxides such as 1,2-epoxy cyclohexane and vinyl cyclohexene diepoxide; and araliphatic epoxides such as styrene oxide can also be used. The solubility and viscosity of the polyamide resins of the invention can be varied by such modifications. Their viscosity decreases if mono-epoxides are used, and is increased by the use of di-epoxides.

The amount of epoxy compound employed can be up to an equivalent of the carboxyl groups present. Mostly, however, a small amount is sufficient to effect the desired modification. The reaction can, in principle, take place at room temperature, suitably in the presence of an inert solvent. However, because of the relatively slow reaction velocity, it is preferable to operate at a higher temperature, for example at 100° C. The copolymerizability of the resin with styrene is not altered by modifications of this type.

The unsaturated reactive polyamide resins of the invention can be copolymerized to form hard to tough-flexible resins by free radical reactions with the same comonomers conventionally reacted with unsaturated polyester resins. These hardenable resin mixtures of the invention can also be combined before hardening with fillers or pigments, and particularly with glass fibers, in order to modify their properties from the point of view of workability or use.

Hardened resin bodies of this type can be employed for surface coatings, casting resins, and patching materials, as adhesives, laminates, foams, and in similar fields of use.

Hardening of the hardenable resin mixtures can be at room tempertaure or at elevated temperature after the addition of substances forming free radicals, particularly organic peroxides, and optional accelerators.

As polymerizable comonomers, vinyl monomers such as styrene, vinyl toluene, divinyl benzene, and chlorostyrene can be employed; as well as acryl monomers like the acrylates and methacrylates; allyl compounds such as diallyl phthalate and allyl cyanurate; and other olefinically unsaturated compounds or mixtures thereof; in amounts from 10 to 50% of the resin mixture.

Suitable free radical forming catalysts particularly include the known organic peroxides such as benzoyl peroxide, di-t-butyl peroxide, lauroyl peroxide, t-butyl perbenzoate, t-butyl hydroperoxide, cumene hydroperoxide, cyclohexanone peroxide, methyl ethyl ketone peroxide, and the like, or mixtures thereof. Known accelerators such as tertiary amines and the cobalt or vanadium salts of organic acids can be used in combination with these peroxides, optionally in conjunction with mercaptans such as lauryl mercaptan or diketones such as acetyl acetone and the like. Besides the catalysts already mentioned, compounds such as those mentioned in German patent publications Nos. 1,219,224; 1,239,472; 1,247,660; and 1,191,100, or those in U.S. Pat. 3,359,249 can be employed for carrying out the polymerization.

A better understanding of the present invention can be had by referring to the following specific Examples 1–11, given by way of illustration. Hardenable resin mixtures comprising the unsaturated polyamine resins of Examples 1–10 were prepared by dissolving the resins in styrene to form a 70 percent solution (except where otherwise noted). These mixtures were then hardened by heating to 120° C. for three hours in the presence of 2 percent of a 50 percent solution of t-butyl perbenzoate to form hardened resin bodies having the properties reported in Table I below:

TABLE I

| Example Number | Hardness (Shore) | Tensile strength (kg./cm.$^2$) | Elongation at rupture (percent) | Impact strength (kg.cm./cm.$^2$)[1] | Heat distortion temperature [ASTM-D 648, (° C.) |
|---|---|---|---|---|---|
| 1 | D 80 | 404 | 11 | 21 | 62 |
| 2 | D 72 | 195 | 53 | [3] | 45 |
| 3 | D 66 | 146 | 138 | [3] | 41 |
| 4 | C 58 | 87 | 110 | [3] | [4] |
| 5[2] | D 83 | 460 | 5 | 19 | 94 |
| 6[2] | D 79 | 381 | 22 | 65 | 52 |
| 7 | D 82 | 484 | 5 | 15 | 90 |
| 8[2] | D 85 | 610 | 3 | 10 | 90 |
| 9 | D 70 | 142 | 61 | 49 | 43 |
| 10[2] | D 78 | 600 | 10 | 15 | 75 |

[1] Standard small rod.
[2] 60 percent solution in styrene.
[3] No break.
[4] Room temperature.

EXAMPLE 1

In a reaction vessel provided with an ascending condenser, a receiver, and a stirrer, 727 grams of commercial dimeric tall oil fatty acid (containing about 10 percent of monomer and about 16 percent of trimer) were slowly heated to 220° C. over a four hour period with 0.05 gram of phosphoric acid and 321 grams of a commercial mixture of 2,2,4- and 2,4,4-trimethyl hexamethylene diamine under nitrogen, with distillative removal of the water of condensation. The mixture was then held at 220° C. for a further four hours, during the last ten minutes of which a vacuum of about 50 mm./Hg was applied. The amino amide obtained had the following characteristics.

Amine number=81
Acid number=0

0.2 gram of t-butyl pyrocatechol and 135 g. of maleic acid anhydride were added to the reaction product at about 75° C., causing the temperature to rise to 95° C. Subsequently, the mixture was further stirred for one hour at 95°–100° C. At room temperature the unsaturated polyamide is an almost solid resin having an unsaturation value, arising from the maleic acid, of 0.12 equivalent/100 grams. The resin has good solubility in benzene, toluene, styrene, ethanol, isopropanol, methyl isobutyl ketone and the like. 50 percent solutions of the resin are stable at room temperature.

EXAMPLE 2

As in Example 1, 750 grams of commercial dimeric tall oil fatty acid and 0.038 gram of phosphoric acid were first heated to about 140°–150° C. in a nitrogen atmosphere for one hour with 468 grams of α,ω-diamino-4,9-dioxadodecane, then slowly heated to 220° C. with distillative removal of the water of reaction, and then held at 220 ° C. for four hours. During the last 15 minutes, a vacuum of about 50 mm./Hg was applied. The amino amide obtained has an acid number of 0.7 and an amine number of 88.

0.67 gram of t-butyl pyrocatechol and 170 grams of maleic acid anhydride were added at 60°–70° C., and the temperature rose slightly. Subsequently, the material was stirred for one hour at 90°–100° C. The unsaturated polyester amide obtained is a tough resin at room temperature and has an unsaturation value of 0.13. The resin is soluble in benzene, toluene, styrene, ethanol, isopropanol, methyl isobutyl ketone, dioxane, and the like.

EXAMPLE 3

As in Example 1, 1,140 grams of commercial dimeric soya oil fatty acid, 0.058 gram of phosphoric acid, and 534 grams of 1,3 - di - 4 - piperidyl propane were heated to 180° C. in a nitrogen atmosphere for one hour, and then held for 3½ hours at 180° C. A vacuum of about 50 mm./Hg was applied during the last 15 minutes. The amino amide obtained as an intermediate product had an acid number of 2.5 and an amine number of 41.

0.4 gram of hydroquinone and, subsequently, 110 grams of maleic acid anhydride were added at 70°–80° C., whereupon the temperature climbed slightly. The mixture was subsequently stirred for one hour at 100°–110° C. The unsaturated polyamide is a hard tough resin at room temperature and has an unsaturation value of 0.065. The resin has good solubility in benzene, toluene, styrene, isopropanol, methyl acrylate, methyl isobutyl ketone, dioxane, diallyl phthalate, and the like.

EXAMPLE 4

As in Example 1, 236 grams of a commercial dimeric tall oil fatty acid, 0.02 gram of phosphoric acid, and 600 grams of the bis-aminopropyl ether of a technical grade dimeric fatty alcohol were first heated to 220° C. over a period of two hours with distillative removal of the water of reaction and then held at this temperature for five hours. During the last fifteen minutes a vacuum of about 50 mm./Hg was applied. The amino amide obtained had an acid number of 0.6 and an amine number of 47.

0.25 gram of t-butyl pyrocatechol and 64 grams of maleic acid anhydride were added at a temperature of 70°–75° C. and stirred for one hour at 90°–100° C. The unsaturated polyamide obtained is a fluid resin of high viscosity having an unsaturation value of 0.074. The resin has good solubility in benzene, styrene, isopropanol, toluene, methyl isobutyl ketone, methyl methacrylate, and the like.

EXAMPLE 5

In a reaction vessel provided with a stirrer, an ascending condenser, and a receiver, 702 grams of dimeric tall oil fatty acid, 0.04 gram of phosphoric acid, and 342 grams of isophorone diamine (3-aminomethyl-3,5,5-trimethyl-cyclohexylamine) were heated in a nitrogen atmosphere for three hours to a temperature of 140° C. The mixture was then slowly heated to a temperature of 210° C. with distillative removal of the water of reaction, and held for five hours at this temperature, during the last 15 minutes of which a vacuum of about 50 mm./Hg was applied. The amino amide obtained had an acid number of 0 and an amine number of 87.4.

200 grams of isopropanol and 0.5 gram of t-butyl pyrocatechol were now added at 80° C. and stirred in for ½ hour. Subsequently, 152 grams of maleic acid anhydride were slowly added at 60° C. and stirred in for one hour at 80° C. A noticeable heat effect could be distinguished. The amine number of the isopropanol solution is 0. The hot solution was then introduced in a thin stream into 750 grams of an ice-water mixture contained within a rapidly running stirring device. The finely-divided unsaturated polyamide precipitating was filtered on a suction filter and dried in an air stream. It is a brown thermoplastic resin softening at about 120° C. and has an unsaturation value of 0.135. The resin can be dissolved in toluene or styrene at concentrations of 60–70 percent to form substantially tack-free, fluid, rheopectic solutions at room temperature. Fluid solutions are obtained in ethanol, isopropanol, and methyl isobutyl ketone, for example.

EXAMPLE 6

As in Example 1, 183.2 grams of an oleic acid-maleic acid adduct (acid number in pyridine=367) and 144.8 grams of α,ω-diamino dioxadodecane were slowly heated to 200° C. with distillative removal of the water of reaction and then held for five hours at 200° C. During the last 30 minutes a vacuum of 50 mm./Hg was applied. The amino-imido-amide obtained had an acid number of 1.5 and an amino number of 71.5.

0.15 gram of hydroquinone and 38 grames of maleic acid anhydride were added at about 70° C., and the mixture was then stirred for one hour at 1000° C. The unsaturated polyamide obtained is a highly viscous brown resin soluble in toluene, styrene, ethanol, isopropanol, and methyl isobutyl ketone, and having an unsaturation value of 0.11.

EXAMPLE 7

663 grams of a $C_{19}$-dicarboxylic acid obtained from oleic acid according to the Reppe method were heated slowly under a nitrogen atmosphere with 474 grams of a commercial trimethyl hexamethylene diamine, with stirring and with distillative removal of the water of reaction of the water of reaction, to a temperature of 220° C. and were then held at this temperature for five hours. Toward the end of the period, a vacuum of 50 mm./Hg was applied for 15 minutes. The amino amide obtained had an acid number of 2.5 and an amine number of 97.

0.7 gram of t-butyl pyrocatechol and 180 grams of maleic acid anhydride were added at 100° C., whereupon the temperature rose in a short period of time to 130° C. Subsequently, the very viscous resin melt was stirred for an additional hour at 110° C. On cooling, it solidified to a brittle resin having an unsaturation value of 0.15. The unsaturated polyamide is soluble, for example, in toluene, benzene, styrene, ethanol, isopropanol, methyl isobutyl ketone, and the like.

EXAMPLE 8

1,267 grams of a 95 percent distilled adduct formed from 1 mol of maleic acid anhydride and 1 mol of linoleic acid methyl ester conjugated by isomerization were heated, with stirring and in a nitrogen atmosphere, over a period of two hours with 757 grams of a commercial isomeric mixture of 2,2,4- and 2,4,4-trimethyl hexamethylene diamine to a temperature of 180° C., and then held for five hours at this temperature. Toward the end, a vacuum of about 50 mm./Hg was applied for thirty minutes. The amino-imido-amide obtained had an acid number of 0.9 and an amine number of 97.

1 gram of hydroquinone and 257 grams of maleic acid anhydride (in three portions) were stirred at 60° C. into 1,842 grams of the resin obtained, whereupon the temperature rose to about 95° C. The highly viscous resin melt was stirred for an additional hour at 95°–100° C. The unsaturated polyamide imide obtained had an unsaturation value of 0.12 and has good solubility in toluene, styrene, isopropanol, methyl isobutyl ketone, and the like.

EXAMPLE 9

210 grams of a commercial dimeric soya oil fatty acid (containing 12 percent of monomer and 22 percent of trimer), 90 grams of phthalic acid anhydride, and 0.015 gram of phosphoric acid were heated over a period of two hours to 220° C. in a nitrogen atmosphere with stirring and with distillative removal of the water of reaction, with 297 grams of α,ω-diamino-4,9-dioxadodecane. The material was then held for 3 hours at 220 C., during the last 20 minutes of which a vacuum of about 50 mm./Hg was applied. The amino amide obtained had an acid number of 0.5 and an amine number of 91.

0.064 gram of t-butyl pyrocatechol and 16 grams of maleic acid anhydride were added to 100 grams of the amino amide at 65° C., whereupon the temperature rose to about 90° C. The mixture was then stirred for one hour at 90°–100° C. The unsaturated polyamide obtained is a tough resin having an unsaturation value of 0.14, and is soluble in toluene, styrene, isopropanol, methyl isobutyl ketone, and the like.

EXAMPLE 10

3,021 grams of a commercial dimerized tall oil fatty acid were combined with 0.16 gram of phosphoric acid and 1,674 grams of a commercial mixture of 2,2,4- and 2,4,4-trimethylhexamethylene diamine as in Example 1. The amino amide obtained had the following values: Amine number=129; Acid number=1.1.

189 grams of maleic acid anhydride were added to the reaction product at about 60° C., whereupon the temperature rose to 95° C. The mixture was stirred for an additional 30 minutes at this temperature. A resin, solid at room temperature, having an unsaturation value of 0.19 equivalent/100 g. was obtained on cooling. The resin has good solubility in benzene, toluene, styrene, ethanol, isopropanol, and the like.

400 grams of the resin and 62 grams of phenyl glycidyl ether were mixed and heated for three hours with stirring at 100° C. The viscosity of the resin at 25° C., measured in a 60 percent styrene solution, was 47 posies. The unmodified resin had a viscosity of 210 poises at 25° C.

EXAMPLE 11

1,710 grams of dimerized tall oil fatty acid, 0.085 gram of phosphoric acid, and 1,026 grams of isophorone diamine were reacted in the manner described in Example 5. An amino amide with an amine number of 131 and an acid number of 1.3 was obtained.

200 grams of the reaction product obtained were heated to 100° C. and 15 grams of maleic acid anhydride were added with stirring. Because of the heat of reaction, the temperature rose to 116° C. At this temperature, an additional 30 grams of the anhydride were added. The reaction mixture was heated for two hours to 160° C. with simultaneous application of a vacuum of 50 mm./Hg. At this point the resin melt was poured on a metal sheet. After cooling and milling, a tack-free thermoplastic powder was obtained. This has good solubility in ethanol, isopropanol, methyl isobutyl ketone, toluene, and styrene.

If the resin is mixed with 20 percent of diallyl phthalate and 2 percent of t-butyl cumyl peroxide and compressed at 170° C., a hardened body having the following properties is obtained:

| | |
|---|---|
| Hardness (Shore) | D 83 |
| Resistance to bending (kg./cm.$^2$) | 1050 |
| Heat distortion temperature [ASTM–D 648] (° C.) | 93 |
| Vicat temperature (° C.) | 102 |

EXAMPLE 12

120 grams of resin 1 were mixed with 40 grams styrene and 40 grams of methacrylic acid 2-ethyl-hexylester. The mixture was hardened with 6 grams of benzoyl peroxide (50% solution in phthalic acid ester) by heating to 120° C., a hardened body having the following properties is obtained:

| | |
|---|---|
| Hardness (Shore) | D 79 |
| Tensile strength (kg./cm.$^2$) | 400 |
| Elongation (percent) | 35 |
| Heat distortion temperature [ASTM–D 648] (° C) | 35 |

What is claimed is:
1. The method of making a reactive polyamide resin containing residual maleic unsaturation which comprises: (A) condensing, at a temperature from 170° C. to 250° C., (a) a polycarboxylic acid component comprising polymeric fatty acid, an adduct or copolymer of an unsaturated fatty acid with an α,β-unsaturated mono- or dicarboxylic acid, a carboxystearic acid, a carboxymethyl stearic acid, a carboxyethyl stearic acid, or a lower alkyl ester of said acids, (b) an optional acid component comprising a dicarboxylic acid having 6 to 12 carbon atoms, or a lower alkyl ester thereof, in an amount of up to 40 equivalent percent of the total polycarboxylic acids condensed, and (c) a diamine component comprising an aliphatic diamine having primary or secondary amino groups and at least 3 carbon atoms, the ratio of amine groups to carboxyl groups in the starting materials employed being between about 0.8:1 and about 2:1 to give a condensation product comprising between 0.35 and 3.5 milliequivalents of free amino groups per 100 grams, and (B) then reacting said free amino groups with from 0.5 to 1 mol of maleic anhydride per mol of amino groups at a temperature between room temperature and about 150° C. to form said resin.

2. The method as in claim 1 wherein the ratio of equivalents of amino groups in said diamine component to equivalents of carboxy groups in said acid components prior to condensation is between about 1.2:1 and about 2:1.

3. A reactive unsaturated polyamide resin prepared according to claim 1.

4. A hardenable resin mixture comprising a reactive unsaturated polyamide resin prepared according to claim 1 and a monomer copolymerizable therewith, said monomer being selected from the group consisting of vinyl aromatic, allyl, and acryl compounds.

5. A hardened resin body prepared by free-radical polymerization of the hardenable resin mixture of claim 4.

6. The method as in claim 1 wherein said reactive polyamide resin containing residual maleic unsaturation is modified by reaction, at a temperature from room temperature to about 100° C., of carboxy groups therein with up to one equivalent part of a mono- or di-epoxide per equivalent of said carboxy groups.

7. A modified reactive unsaturated polyamide resin prepared according to claim 6.

8. A hardenable resin mixture comprising a reactive unsaturated polyamide resin prepared according to claim 6 and a monomer copolymerizable therewith, said monomer being selected from the group consisting of vinyl aromatic, allyl, and acryl compounds.

9. A hardened resin body prepared by free-radical polymerization of the hardenable resin mixture of claim 8.

References Cited

UNITED STATES PATENTS

| 3,420,789 | 1/1969 | Wilson | 260—18 |
|---|---|---|---|
| 3,383,391 | 5/1968 | Carlick et al. | 260—18 |
| 3,224,893 | 12/1965 | Floyd et al. | 260—78X |
| 3,127,365 | 3/1964 | Floyd | 260—18X |
| 2,955,951 | 10/1960 | Aelony | 260—18X |
| 2,174,619 | 10/1939 | Carothers | 260—78 |

DONALD E. CZAJA, Primary Examiner

C. W. IVY, Assistant Examiner

U.S. Cl. X.R.

260—23, 30.4, 31.2, 31.8, 32.8, 33.4, 33.6, 78, 830, 836, 857

PO-1050
(5/69)

UNITED STATES PATENT OFFICE
CERTIFICATE OF CORRECTION

Patent No. 3,554,944　　　　　　　Dated　January 12, 1971

Inventor(s) Dietrich Helm et al.

It is certified that error appears in the above-identified patent and that said Letters Patent are hereby corrected as shown below:

In column 9, line 51, the reported Heat distortion temperature should read -- 66 -- rather than "35".

Signed and sealed this 11th day of May 1971.

(SEAL)
Attest:

EDWARD M. FLETCHER, JR.　　　　　　WILLIAM E. SCHUYLER, JR
Attesting Officer　　　　　　　　　　Commissioner of Patent